United States Patent Office 3,567,368
Patented Mar. 2, 1971

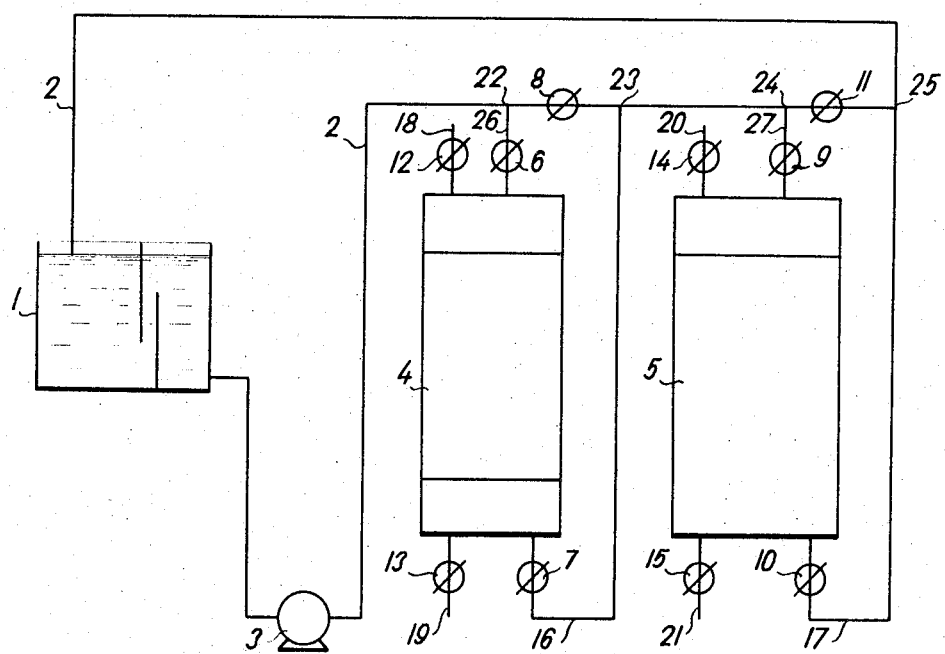

3,567,368
METHOD FOR PRODUCING RHODIUM CONCENTRATES
Frantisek Nekvasil, Kutna Hora, Dorboslav Dolezal, Rynovice, and Jiri Pelikan, Kutna Hora, Czechoslovakia, assignors to Ustav nerostynych surovin, Kutna Hora, Czechoslovakia
Filed Mar. 29, 1967, Ser. No. 627,594
Claims priority, application Czechoslovakia, Mar. 29, 1966, 2,059/66
Int. Cl. C01g 55/00
U.S. Cl. 23—51      2 Claims

ABSTRACT OF THE DISCLOSURE

A process for recovering a rhodium concentrate from an acid solution which comprises passing a rhodium containing solution through an anion exchanger column, precipitating cationic rhodium on said anion exchanger until a zone of cationic recovered rhodium is formed and eluting cationic rhodium from said zone.

---

This invention relates generally to a method for recovering rhodium concentrates from acid solutions and more porticularly from washing and rinsing aqueous solutions, and to equipment especially adapted for this purpose. By the term washing and rinsing solutions, is meant the aqueous liquids used to rinse metal-plated objects e.g. imitation precious jewelry or laboratory instruments after they have been taken from a galvanic rhodium-plating bath. These aqueous liquids contain varying amounts of rhodium and diluted acid.

The use of ion exchangers to recover metal salts from their solutions is well known. When these metal salt containing solutions are passed through an ion exchanger, adsorption of ions with a corresponding charge occurs on the ion exchanger. On such an ion exchanger, a continuous layer of recovered salts is formed the amount depending on the solution concentration. However, this method cannot be used in industrial practice for recovering rhodium from by-product solutions because the low rhodium concentration and and acidity of the solution gives unsatisfactory yields of recovered rhodium and its recovery is therefore uneconomical. The by-product washing and rinsing waters are at present drained into waste water sewers without any utilization or recovery of contained rhodium.

This disadvantage is overcome by the present invention which is carried out as described hereinbelow. The aqueous liquid to be processed is passed through an anion exchanger column, the latter being in a hydroxylic- or weak-acid-operating cycle, until a clearly defined zone is formed containing the recovered rhodium. The passage of liquid is continued until the front of the zone reaches the outlet end of the anion exchanger column. The rhodium is then advantageously separated from the aforementioned zone in the column by an elution agent. The rhodium will separate readily from the zone which has reached the outlet end of the anion exchanger column by an additional flow of the processed liquid which operates as an elution agent. The thus obtained elution liquid enriched by rhodium eluted from the aforementioned zone is taken into a second anion exchanger column—which is also maintained in a hydroxylic- or weak-acid-operating cycle. It is necessary to transfer this liquid as long as the zone or recovered rhodium flows out of the first anion exchanger column into the second one. It is entirely possible to transfer several zones of recovered rhodium into the second anion exchanger column either from one or from several initial preceding anion exchanger columns. The equipment used to carry out the process of this invention comprises one or more adsorption columns containing anion exchangers, the columns being connected one to another by the by-product washing and rinsing water inlet and linked by controlled circulating pipes with a washing or rinsing vat itself or a washing and rinsing water storage tank.

The method according to this invention is based on the fact that, when passing an acidic rhodium containing solution through an anion exchanger maintained in a hydroxylic- or weak-acid-operating cycle, cations are recovered on the anion exchanger. In a manner analogous to chromotography, a zone is formed on the surface of the anion exchanger. This zone moves forward in the flow direction of the acid solution with a corresponding concentration increase of the recovered rhodium.

As the processed acid rhodium solution flows through the anion exchanger column, the latter being in the hydroxylic- or weak-acid-operating cycle, the ions of the acid in the solution are exchanged for the hydroxylic or weak-acid-ions bound to the anion exchanger. The acid solution is thus neutralized and as rhodium is precipitated from the solution in the form of rhodium hydroxide and basic rhodium salts which are adsorbed on the surface of the anion exchanger grains. A well-defined yellow-brown-coloured zone is formed immediately at the inlet end of the anion exchanger column. Even at this early stage of the process the recovered rhodium can be separated from the zone by incinerating that part of the column containing rhodium or by eluting the zone. If there remains some solution to be disposed of it may be passed through the anion exchange column without interruption. Since the solution operates as an elution agent because of its acidity it elutes first the rhodium adsorbed in the zone and the eluate, thus enriched, then flows onto the lower anion exchanger layer portions. There, the processed solution is neutralized again by the ion exchanging activity, rhodium hydroxide and its basic salts are precipitated and adsorbed on the surface of the anion exchanger grains at the zone which moves forward in the flow direction of the solution with a simultaneous increase of the rhodium concentration in the zone. The processed solution is passed through the anion exchanger column until the front of the zone carrying the adsorbed rhodium compounds arrives at the outlet end of the anion exchange column. The rhodium concentrate may be recovered by incinerating the anion exchanger, or by eluting the column, which operation is carried out only for as long as a solution containing rhodium flows from the anion exchange column i.e. as long as the zone of recovered rhodium is being eluted from the anion exchanger column.

If there is sufficient solution to be processed such that all the rhodium contained in it cannot be recovered in one anion exchange column, the flow of the processed solution may be continued even after the front of the zone has reached down to the outlet end of the anion exchanger column. In such a case, the rhodium zone is eluted by the processed solution itself and the liquid flowing out of the anion exchanger column which has been enriched by concentrated rhodium eluted from the zone, is transferred into the second anion exchanger column—this one being in the hydroxylic- or weak-acid-operating cycle—the transfer continuing for as long as the zone of recovered rhodium passes from the first anion exchanger column into the second one.

This transfer of partial zones formed in one or more initial anion exchanger columns into the second column is repeated several times until the front of the rhodium zone of increased concentration reaches the outlet end of the second anion exchanger column or until there is no more by-product solution to be disposed of by treatment. By repeated transfer of multiple zones with rhodium content into the second column, one highly concentrated rhodium zone is formed and eventually it fills the whole of the second column. This single zone contains all of the rhodium which was originally recovered in several partial zones. Thus, there is no need to separate rhodium from each one of the separate zones but it is only necessary to separate it from this one final zone. When separating rhodium from this zone by elution, the amount of the required elution agent is less and the thus obtained solution is of higher rhodium concentration than if the rhodium were eluted from the several separate zones.

During the period of formation of a rhodium containing zone, a neutralized liquid flows from the anion exchanger column i.e. demineralized water. This neutralized liquid is either drained into a waste water sewer or it may be re-utilized as desired. If the method according to this invention is applied to processing rinsing waters from rhodium-plating it is advantageous to return the neutralized liquid flowing from the anion exchanger column into the rinsing vat or into the clean rinsing water supply tank instead of draining it into the sewer. A substantial amount of fresh rinsing water can be thus saved.

The flow sheet, presented herewith is a schematic diagram representing an example of equipment used to carry out the method according to this invention by means of a continuous technology of rhodium recovery from rinsing waters.

The flow circuit whose main part is the circulating tubing 2 comprises the following equipment connected in series, rinsing vat 1, pump 3, pre-adsorption column 4 containing anion exchanger and high-concentration column 5 also containing a charge of anion exchanger. The inlet end of the pre-adsorption column 4 is linked to the circulating tubing 2 by an inlet piping 26 provided with an inlet closing device 6 and the outlet end of the pre-adsorption column 4 is connected to the circulating piping 2 by an outlet tubing 16 provided with an outlet closing device 7. In the same way, the inlet end of the high concentration column 5 is connected to the circulating tubing 2 by an inlet piping 27 provided with an inlet closing device 9 and its outlet end by an outlet piping 17 provided with an outlet closing device 10. In addition, the pre-adsorption column 4 is provided at the inlet end with an inlet tubing 18 having an inlet closing device 12 and at the outlet end with an outlet tubing 19 with an outlet closing device 13. Similarly, the high-concentration column 5 is provided at the inlet end with an inlet tubing 20 with an inlet closing device 14 and at the outlet end with an outlet piping 21 with an outlet closing device 15. Between the inlet tube 26 junction 22 of the pre-adsorption column 4 and the outlet tube 16 junction 23 of the same column, the circulating piping 2 is provided with an auxiliary closing device 8. Similarly between the inlet tube 27 junction 24 of the high-concentration column 5 and the outlet tube 17 junction 25 of the same column, the circulation piping 2 is provided with a closing device 11.

In the initial stage of carrying out the method according to this invention, the equipment is adjusted in such a manner that rinsing water pumped from the rinsing vat 1 by the pump 3 into the circulation piping 2 flows into and through the pre-adsorption column 4. The auxiliary closing device 8 and the closing device 12 are closed whereas the inlet closing device 6 is open. In the pre-adsorption column 4 a zone containing recovered rhodium is formed while the neutralized liquid leaving through the outlet end of the pre-adsorption column 4 flows either through piping 19 with the outlet closing device 13 open and outlet closure 7 closed or it is returned to the rinsing vat 1 with closure closed 13 and with both the outlet closure 7 and the auxiliary closure 11 open. The high-concentration column 5 is at this stage kept out of operating by closing both the inlet closing device 9 and outlet closure 10.

At the point of operation when the front of the zone containing the recovered rhodium reached the outlet end of the pre-adsorption column 4, the high-concentration column 5 is put into operation by opening its inlet closure 9 and closing the auxiliary closing device 11. If the liquid flowing away from the outlet end of the pre-adsorption column 4 has been drained off through the outlet tube 19, it is necessary to close the outlet closure 13 of this column and open the outlet closure 7. The liquid leaving through the outlet end of the high-concentration column 5 flows either through the outlet piping 21 with the closure 15 open and with the outlet closure 10 closed or it returns to the rinsing vat 1 with the outlet closure 15 closed and outlet closure 10 open.

The liquid leaving the pre-adsorption column 4 is transferred to the high concentration column for so long as and until the entire zone containing the recovered rhodium has passed from the pre-adsorption column 4 into the high-concentration column 5. At this point the influx of rinsing water into the pre-adsorption column 4 is interrupted by closing the inlet closure 6 and outlet 7. By opening both the inlet closure 12 and the outlet closure 13 the pre-adsorption column can be rinsed by means of a regenerating agent e.g. an alkaline hydroxide, whereby the column is again included in the operating cycle. During the regeneration of the pre-adsorption column 4 either the pump 3 is shut off so that the liquid stops flowing through the circulating piping 2 or, by opening the auxiliary closures 8 and 11, and by closing both the inlet closure 9 and outlet closure 10 of the high-concentration column 5, the rinsing water returns to the rinsing vat 1. It is also possible to pass the rinsing water, during the regeneration of the pre-adsorption column 4, through the high-concentration column 5 by opening the auxiliary closing device 8 and closing the auxiliary closure 11. Thus, during the regeneration of the pre-adsorption column 4, rhodium contained in the rinsing water is recovered in the high-concentration column 5.

After the regeneration of the pre-adsorption column 4 initial conditions in the equipment are restored and in the pre-adsorption column 4 a zone containing rhodium is again formed. This zone is as above described, transferred into the high-concentration column 5.

This transfer of zones from the pre-adsorption column 4 into the high-concentration column 5 is repeated several times, this process being carried out for so long as and until the zone travelling through the high-concentration column 5 reaches the column outlet end or until there is no more rinsing water to be processed. Hereupon, both the inlet closing device 9 and the outlet closure 10 of the high-concentration column 5 are closed and the recovered rhodium is eluted from the high-concentration column 5 by means of a convenient elution agent e.g. by means of diluted sulphuric acid which may be permitted to circulate through the high-concentration column 5 for some period to save the elution agent. In order to recover the elution agent, the inlet piping 20 and outlet piping 21 respectively may be used when both the inlet closure 14 and outlet closure 15 are opened. The liquid enriched with rhodium which leaves the high-concentration column 5 may be considered the final product of this proceeding and serves as raw-material for further treatment.

Another modification of this equipment consists in utilizing the pre-adsorption column 4 for a different function. Instead of using only one pre-adsorption column 4, it is convenient to set into the flow circuit several of these columns so that anyone of them can, intermittently be attached to the same source of rinsing water. This arrangement makes possible an operation wherein, while one of these columns is regenerated, another one may be used for rhodium recovering and a third one for zone transfer into the high-concentration column 5. It is, of course, also possible that in an equipment comprising only one pre-adsorption column 4, another one may be set up to recover rhodium while the first one is being regenerated. At industrial plants which dispose of several sources of rinsing waters, single pre-adsorption columns may treat water from different rinsing water sources and the zones of recovered rhodium may be transferred to only one high-concentration column 5 either simultaneously or successively.

EXAMPLE 1

Through a column filled with 16 ml. of slightly basic anion exchanger of the polyamide type and maintained in hydroxylic-operating cycle, a solution containing 30 mg. per liter of rhodium and 600 mg. per liter of sulphuric acid was passed at a rate of 2 ml. per minute. On the anion exchanger column, a light-yellow zone was formed, the latter travelling down the column in the flow direction of the solution. After 3,330 ml. of the solution passed through the column, the front of the light-yellow zone reached the outlet end of the column. By adding another 100 ml. of the treated solution, the zone was transferred into the second column filled with the same quantity of anion exchanger as the first column. The process was interrupted and the anion exchanger in the first column was put into operating use by rinsing the column with alkaline hydroxide. Another portion of rhodium containing solution was added to the first column and the whole procedure repeated for as long as, and until the front zone in the second column reached its outlet end. Rhodium was then eluted from this zone by diluted sulphuric acid which was circulated in the second column. In the obtained eluate, there was 280 mg. of rhodium.

EXAMPLE 2

Through a column filled with 16 ml. of slightly basic anion exchanger of the polyamide type in a hydroxylic-operating cycle, rinsing waters containing from 0.1 mg. to 2 g. per liter were passed at a speed of 3 liters per minute. After 12 cubic meters of rinsing waters passed through the column, the front of the zone of recovered rhodium reached the outlet end of the column. The zone contained 62.4 g. of rhodium in the form of its basic salts. This zone was transferred into the second column, also filled with 15 liters of anion exchanger of the polyamide type in a hydroxylic-operating cycle. This procedure was repeated several times until the zone reached the outlet end of the second anion exchanger column, whereupon this zone was eluted with diluted sulphuric acid. There was obtained 15.2 g. of rhodium, in the form of its basic salts, per 1000 ml. of anion exchanger.

The method and equipment according to this invention make possible recovery of rhodium concentrates from rinsing waters of galvanic rhodium-plating as well as from other acid solutions of rhodium, e.g. deteriorated rhodium baths and the like which contain rhodium in trace-quantities, the recovery being carried out in an economic and industrially feasible manner to yield a solution containing rhodium in high concentration. This equipment to carry out the method is very simple in design and it is possible to automate the process to a considerable degree.

The invention has been described hereinabove in preferred embodiment, but it is to be understood that the invention is in no way confined to the particular forms, uses or sizes shown and described, the same being merely illustrative, and that the invention may be made and carried out in other ways without departure from the spirit of the invention, and therefore there is claimed the right to employ all equivalents coming within the scope of the appended claims and by means of which the objects of the invention are obtained and new results and advantages accomplished.

What is claimed is:

1. A method of producing rhodium concentrates from acid rinsing waters of galvanic rhodium-plating processes which comprises passing the rhodium containing acidic solution through an anion exchanger column maintained in a hydroxylic or weak-acid-operating cycle until a clearly defined rhodium zone containing precipitated rhodium values is formed, and continuing said passage until the front of the said rhodium containing zone reaches the outlet end of the said anion exchanger column, and thereafter eluting the rhodium from said zone with additional quantities of the rhodium containing acidic solution as the elution agent.

2. A method as claimed in claim 1, comprising transferring the eluting agent liquid, enriched with rhodium eluted from the aforementioned zone, to a second anion exchanger column maintained in a hydroxylic- or weak-acid-operating cycle, and continuing said passage until the zone of recovered rhodium passes from the first anion exchanger column into the second one, whereby additional zones from one or more anion exchanger columns are passed into the second anion exchanger column.

References Cited

UNITED STATES PATENTS

| 2,371,119 | 3/1945 | Nachod | 23—50BE |

FOREIGN PATENTS

| 514,360 | 1939 | Great Britain | 23—50BE |
| 781,726 | 8/1957 | Great Britain | 23—50BE |
| 848,555 | 9/1960 | Great Britain | 23—50BE |

HERBERT T. CARTER, Primary Examiner

U.S. Cl. X.R.

23—117, 140